US005274691A

United States Patent [19]

Neri

[11] Patent Number: 5,274,691

[45] Date of Patent: Dec. 28, 1993

[54] DENTAL FILM HOLDER WITH DEVELOPING AND FIXING FLUID CHAMBERS

[76] Inventor: Vincenzo Neri, Via Privata di Serenella 31/22, 18038 Sanremo (Imperia), Italy

[21] Appl. No.: 854,292

[22] Filed: Mar. 19, 1992

[30] Foreign Application Priority Data

Jul. 17, 1991 [IT] Italy ........................... T091U000176

[51] Int. Cl.[5] ........................................... G03B 42/04

[52] U.S. Cl. .................................... 378/183; 378/168; 206/455

[58] Field of Search ............... 378/183, 168, 169, 170, 378/38, 39, 40; 206/455, 219, 222

[56] References Cited

U.S. PATENT DOCUMENTS 3,430,042 2/1969 Neri .................................... 378/169
4,721,209 1/1988 Guazzotti ........................... 378/183

FOREIGN PATENT DOCUMENTS 0138132 9/1987 European Pat. Off. .
1357042 2/1964 France .
53883 5/1980 Italy .
52920 8/1983 Italy .
1169409 11/1969 United Kingdom .

*Primary Examiner*—David P. Porta
*Assistant Examiner*—Kim-Kwok Chu
*Attorney, Agent, or Firm*—Edward D. Manzo; Ted K. Ringsred

[57] ABSTRACT

A device for developing and fixing a dental radiography plate includes a casing of flexible, impermeable material which is sealed around its entire perimeter and has first and second compartments interconnected by a flat duct. The first compartment contains a radiographic plate and the second compartment contains a sachet of a liquid for processing the plate. The sachet is adapted to release the liquid when its pressure exceeds a predetermined value as a result of the compression of the sachet.

6 Claims, 3 Drawing Sheets

DENTAL FILM HOLDER WITH DEVELOPING AND FIXING FLUID CHAMBERS

BACKGROUND OF THE INVENTION

The present invention relates to a device for developing and fixing a dental radiography plate, of the type including:

a casing of flexible material which is opaque to visible radiation, the casing having first and second compartments interconnected by a duct, a radiographic plate housed in the first compartment, and at least one sealed container for the liquid for processing the radiographic plate, the container being disposed in the second compartment and being able to release the liquids as a result of the rupture of a portion of the container.

A device of the type specified above is known from the present Applicant's document GB 1,169,409 and U.S. Pat. No. 3,430,042 dated Feb. 25, 1969. This known device provides for the use of two sachets in the second compartment of the casing, one containing a developing liquid and the other a fixing liquid. In this known device,. the two sachets have respective tongues which project from the casing through a side opening in the second compartment. When a tongue is pulled, the respective sachet is torn and the liquid reaches the compartment containing the radiographic plate through the duct which connects it to the compartment containing the sachets.

In this known device, the casing containing the sachets must be at least partially open so that the tongues for opening the sachets can extend through it. After the sachets have been torn it is therefore not possible to remove the plate from the casing without spilling the used liquids.

The spillage of the liquids from the casing constitutes a problem because of their oxidising and polluting characteristics, particularly in view of the hygiene and sanitary requirements for a dental surgery.

The object of the present invention is to provide a device of the type defined at the beginning which prevents the spillage of the developing and fixing liquids and which is simpler, cheaper and easier to use than the known device described above.

SUMMARY OF THE INVENTION

According to the present invention, this object is achieved by the provision of a device of the type specified at the beginning, characterised in that the casing is sealed around its entire perimeter, and in that the container is adapted to release its liquid contents when the pressure of the liquid exceeds a predetermined value as a result of the compression of the container.

By virtue of these characteristics, after the liquid has performed its action on the radiographic plate, the liquid can be collected in the second compartment and the plate can be removed from the first compartment without the loss of any liquid from the casing. The casing and the used liquids therein can then be thrown into a container for the selective collection of pollutant waste.

The device according to the invention offers a better guarantee of hygiene and cleanliness since the dentist's hands are not soiled by the liquid for processing the film.

In a preferred embodiment of the invention, the container is filled with a developing and fixing liquid monobath. In this case, the steps necessary to process the radiographic plate are simplified. In fact, in the device according to the invention, it suffices to compress the compartment containing the sachet in order to release the monobath liquid which develops and fixes the radiographic plate, whereas previously it was necessary to open a first sachet and to wait for a certain period of time before tearing the second sachet.

Alternatively, there may be two separate containers, one containing the developing liquid and the other the fixing liquid, the containers being opened in succession by the application of external pressure to the casing containing them.

Further characteristics and advantages of the present invention will become clear in the course of the detailed description which follows with reference to the appended drawings, provided purely by way of non-limiting example, in which:

DETAILED DESCRIPTION OF THE INVENTION

Figure 1:
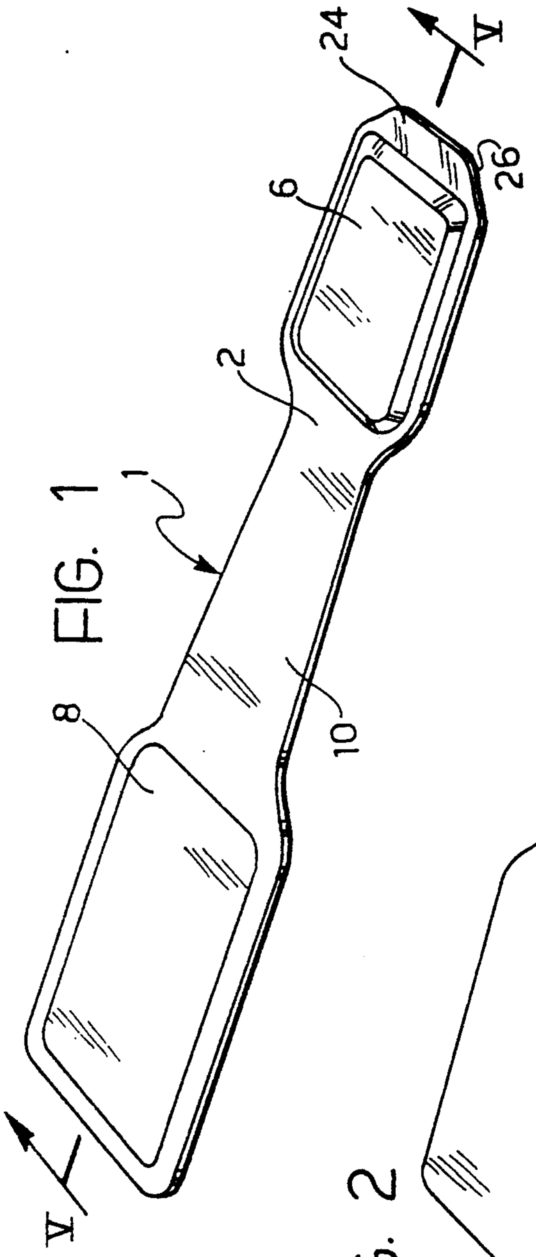
FIG. 1 is a perspective view of a device according to the invention.
Figure 2:
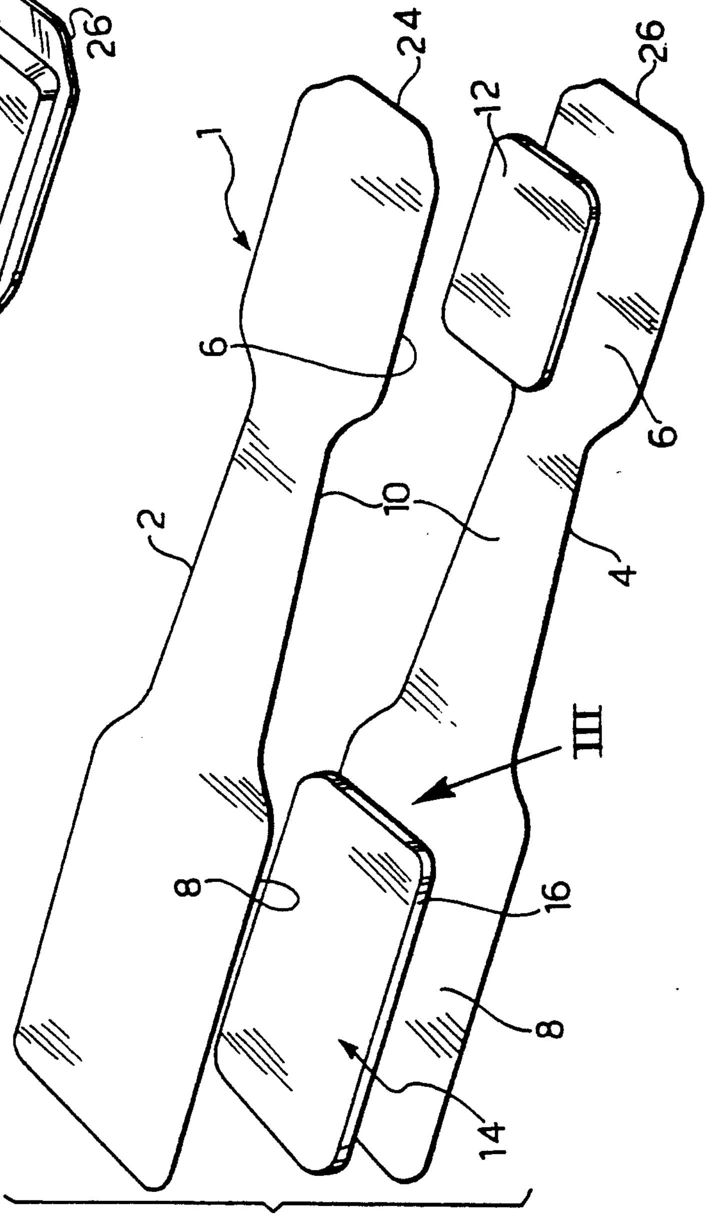
FIG. 2 is an exploded, perspective view of the device of FIG. 1.

With reference to the drawings, a casing, indicated 1, is constituted by two sheets 2, 4 of flexible plastics material which is opaque to visible radiation, the sheets 2, 4 being fixed together around their perimeters by thermocompression bonding. The casing 1 defines a first compartment 6, a second compartment 8, and a duct 10 interconnecting the compartments 6 and 8.

The first compartment 6 contains a radiographic plate 12 and the second compartment 8 contains a sachet 14 of impermeable plastics material containing a predetermined quantity of a developing and fixing liquid monobath for processing the plate 12. The plate 12 and the sachet 14 are placed between the two sheets 2, 4 before the perimeters of the sheets 2, 4 are bonded. After the bonding has been carried out, the plate 12 and the sachet 14 are retained in their respective compartments 6, 8, since the duct 10 is narrower than the compartments 6, 8.

Figure 3:
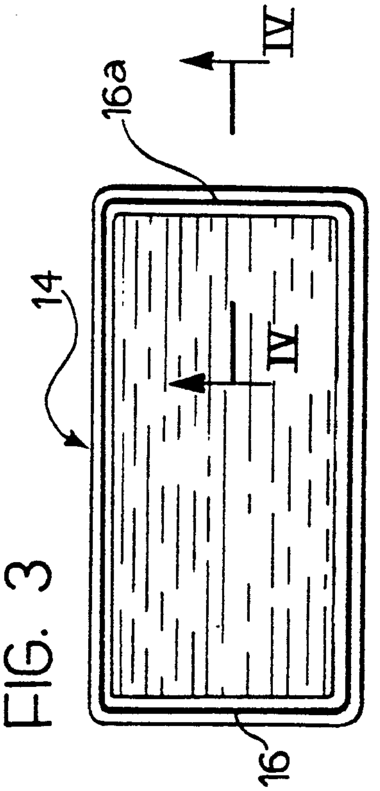
FIG. 3 shows the element indicated by the arrow III in FIG. 2.

The sachet 14 containing the developing and fixing liquid is sealed along its perimeter by a thermocompression-bonded seam 16 (FIG. 3). The bonded seam 16 along the side 16*a* of the sachet 14 which faces the duct 10 is less resistant to rupture than the rest of the seam 16.

Figure 4:
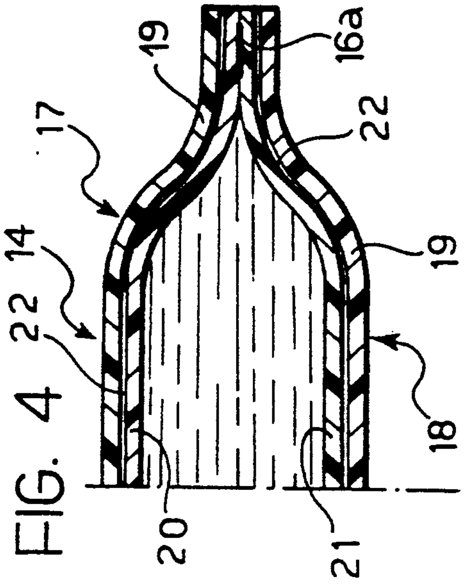
FIG. 4 is a section taken on the line IV—IV of FIG. 3, on an enlarged scale.

As can be seen in FIG. 4, the sachet 14 is constituted by two sheets 17, 18 which are fixed together by the bonding 16, 16*a*. Each of the sheets 17, 18 is constituted by an outer layer 19 of material which is impermeable to oxygen and an inner layer 20 or 21 of material which can be bonded. The layers 19, 20 are connected by a layer 22 of resin, for example, of the type known commercially by the trade name Vicolin. The outer layers 19 of the two sheets 17, 18, are constituted, for example, by polyester about 12 microns thick.

The inner layers 20, 21 of the two sheets 17, 18 are made of materials having different melting points. For example, the layer 20 may be made of linear polyethylene including 3% of ethylvinyl acetate and having a melting point of about 120° C.

The layer 21 may be made of polyethylene of the type marketed by Du Pont under the trade name Surlyn which has a melting point of about 80° C.

The bonded seam 16 along three sides of the sachet 14 is formed at a temperature above the higher of the two melting points of the bonding layers 20, 21, for example, at a temperature of 130° C., with a contact pressure of about 6 atm. The seam along the fourth side 16*a*, or a portion thereof, is formed at a temperature intermediate the melting points of the two layers 20, 21, for example, at 110° C. and with a lower pressure (for example, 4 atm).

In correspondence with the first compartment 6, the two sheets 2, 4 have respective tabs 24, 26 which extend outwardly of the perimetral bonding of the casing 1. The two tabs 24, 26 can be gripped manually and pulled apart in order to break the bonding which joins the two sheets 2, 4 and remove the plate 12.

Figure 5:
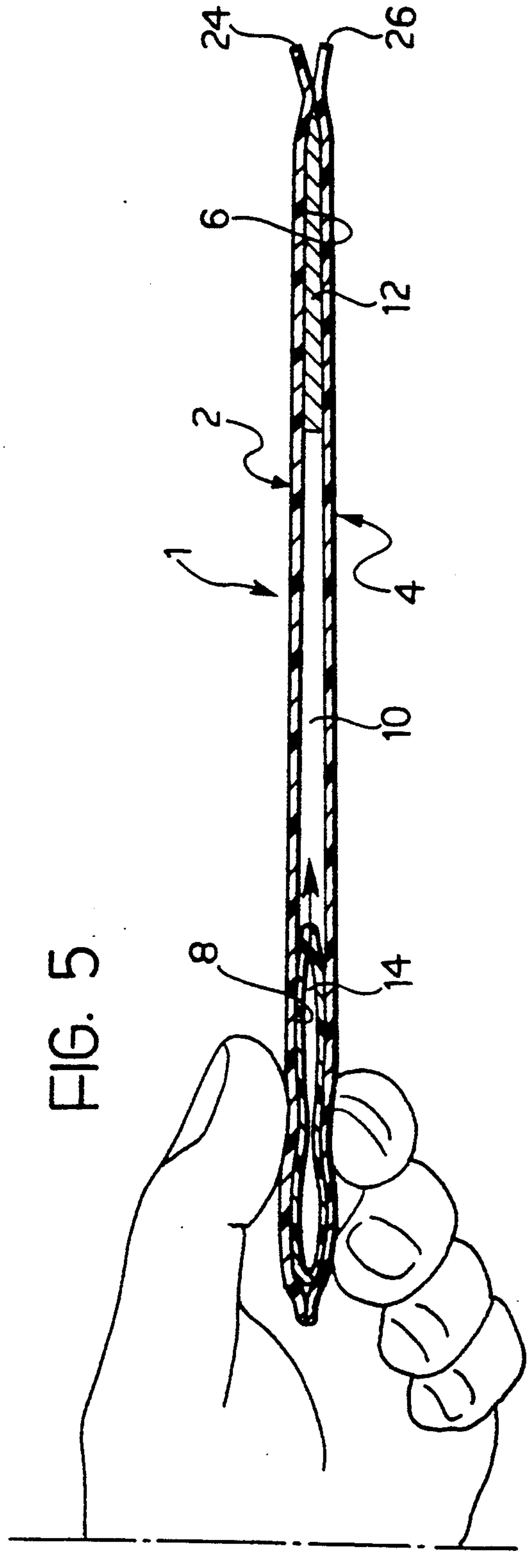
FIG. 5 is a section taken on the line V—V of FIG. 1, showing the device according to the invention in use.

In use, the compartment 6 which contains the plate 12 is placed in the patient's mouth at the point to be X-rayed. After the radiographic plate 12 has been exposed, the second compartment 8 is compressed manually (see FIG. 5). The increased pressure created in the sachet 14 causes the weaker region 16*a* of the bonded seam 16 to burst. The liquid then passes along the duct 10 and reaches the first compartment 6, where it performs its action in contact with the plate 12.

When the action of the liquid is complete, the used liquid is returned to the second compartment 8 by orienting the casing 1 vertically with the compartment 8 lowermost. The tabs 24, 26 are then pulled apart to break the bonding of the casing 1 in correspondence with the first compartment 6 and the radiographic plate 12 is removed. The casing 1 can then be folded over to prevent the liquid from escaping and thrown into a container for the selective collection of pollutant waste.

Figure 6:
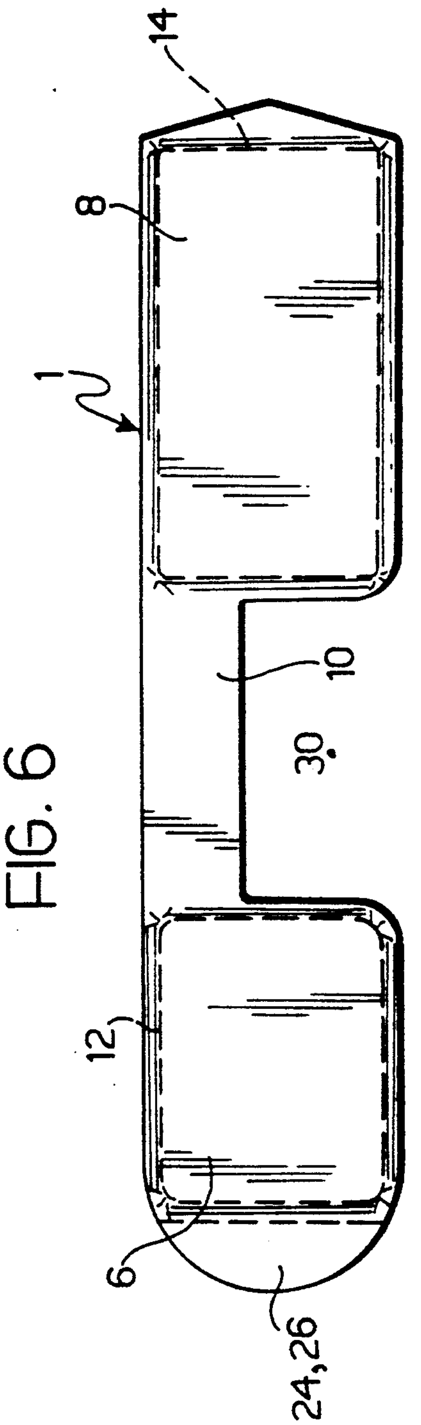
FIG. 6 is a plan view showing a first variant of the device of FIG. 1.
Figure 7:
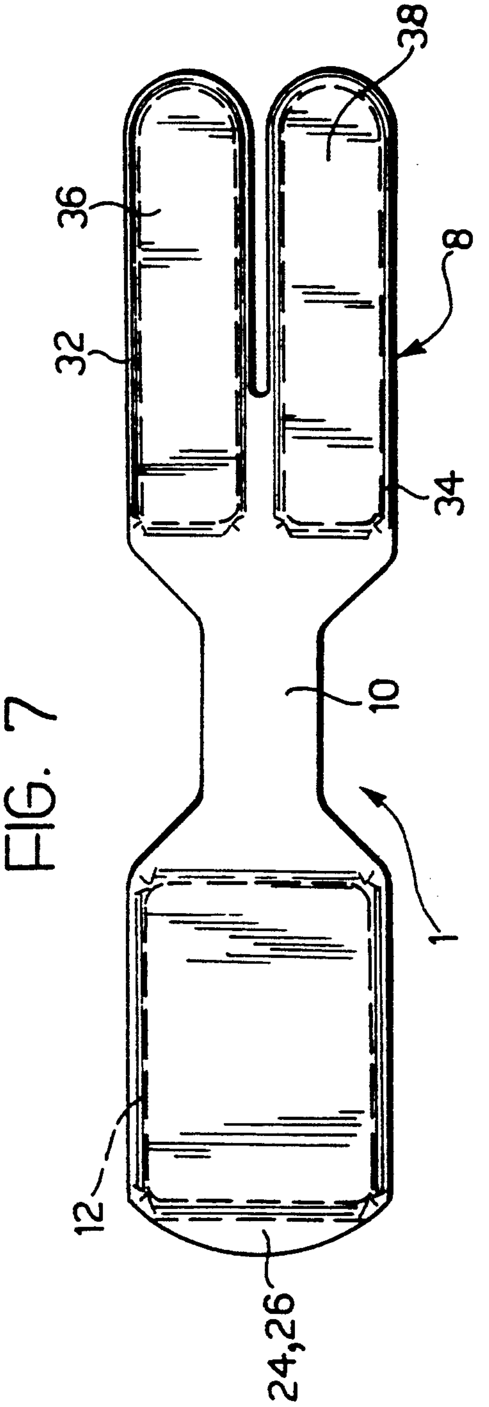
FIG. 7 is a plan view showing a second variant of the device according to the invention.

FIGS. 6 to 7 show two variants of the device of FIG. 1. Elements corresponding to those described above are indicated by the same reference numerals.

In the variant of FIG. 6, the duct 10 is adjacent the line joining two aligned sides of the compartments 6, 8. An empty space 30 is thus left between the two compartments 6, 8, which facilitates the positioning of the compartment 8 in the patient's mouth.

In the variant of FIG. 7, the second compartment 8 is divided into two sections 32, 34 both communicating with the duct 10. The sections 32, 34 contain two sachets 36, 38, one filled with developing liquid and the other with fixing liquid. The casing 1 in this embodiment is also sealed along its entire perimeter. The two sachets are similar to that described above and the liquid is released by the compression of the sachet.

The two sections are separate because, in use, it is necessary first to tear the sachet 36 containing the developing liquid and, after a certain period of time, to tear that containing the fixing liquid.

I claim:

1. A device for developing and fixing a dental radiography plate, the device including:

a casing of flexible material which is opaque to visible radiation and defines first and second compartments interconnected by a duct;

a radiographic plate housed in the first compartment; and at least one sealed container for liquid for processing the radiographic plate, the container being disposed in the second compartment and being able to release the liquid as a result of the rupture of a portion of the container, wherein the casing is sealed around its entire perimeter, and the container is adapted to release the liquid when the pressure of the liquid exceeds a predetermined value as a result of the compression of the container, and wherein the casing is constituted by two sheets bonded together around their perimeters, and wherein the two sheets have respective tabs which extend outwardly from the bonding in correspondence with the first compartment and can be gripped and pulled apart so as to break the bonding for the removal of the plate from the first compartment without spilling the liquid.

2. A device according to claim 1, wherein the container has a bonded perimetral seam with a region which is less resistant to the pressure of the liquid than the rest of the bonded seam.

3. A device according to claim 1, wherein the container is filled with a developing and fixing liquid monobath.

4. A device according to claim 1, wherein the second compartment is divided into two sections which contain respective containers, one containing developing liquid and the other containing fixing liquid.

5. A device according to claim 1, wherein the duct is adjacent a line joining two aligned sides of the compartments.

6. A device for developing and fixing a dental radiography plate, the device including:

a casing of flexible material which is opaque to visible radiation and defines first and second compartments interconnected by a duct, the casing being of a size suitable for taking dental radiographs;

wherein the casing is constituted by two sheets bonded together around their perimeters so that the casing is sealed around its entire perimeter;

wherein the first compartment contains a dental radiographic plate;

wherein the second compartment contains a burstable developer pouch having a generally rectangular shape and containing liquid for processing the radiographic plate;

wherein the pouch is positioned to release the liquid into said duct for delivery to said first compartment as a result of bursting said pouch; and wherein each of said two sheets has a respective tab which each extend distally outwardly from the bonding in the direction of the duct, the tabs being adjacent to the first compartment and forming a distal free end of the device, the tabs being positioned and configured to be manually gripped and pulled apart so as to break the bonding at the first compartment to permit the manual removal of the plate therefrom without spilling the liquid.

* * * * *